Nov. 11, 1958 P. S. ROLLER 2,860,090
ELECTROLYTIC GENERATION OF METAL HYDROXIDE
Filed Feb. 29, 1952 3 Sheets-Sheet 3

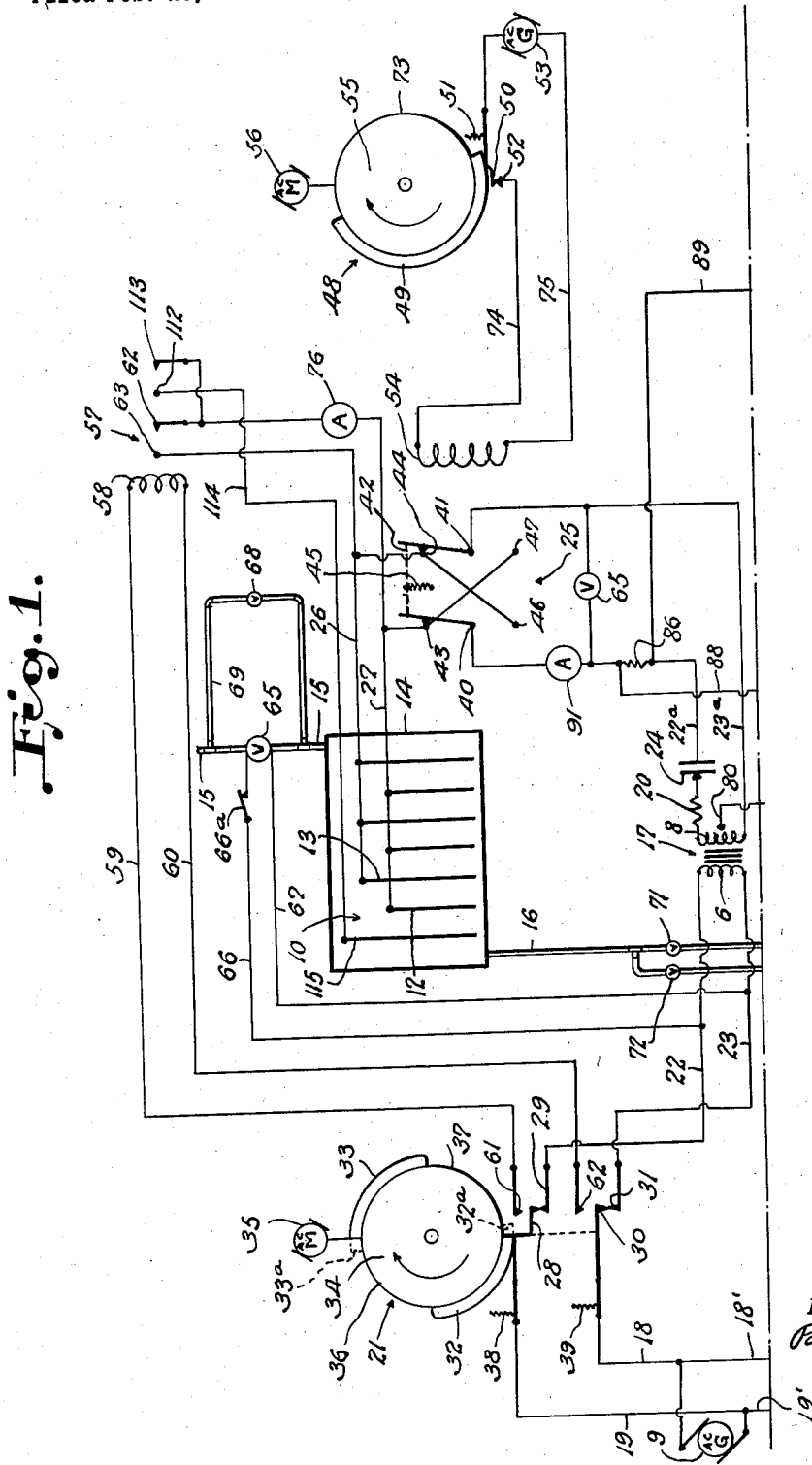

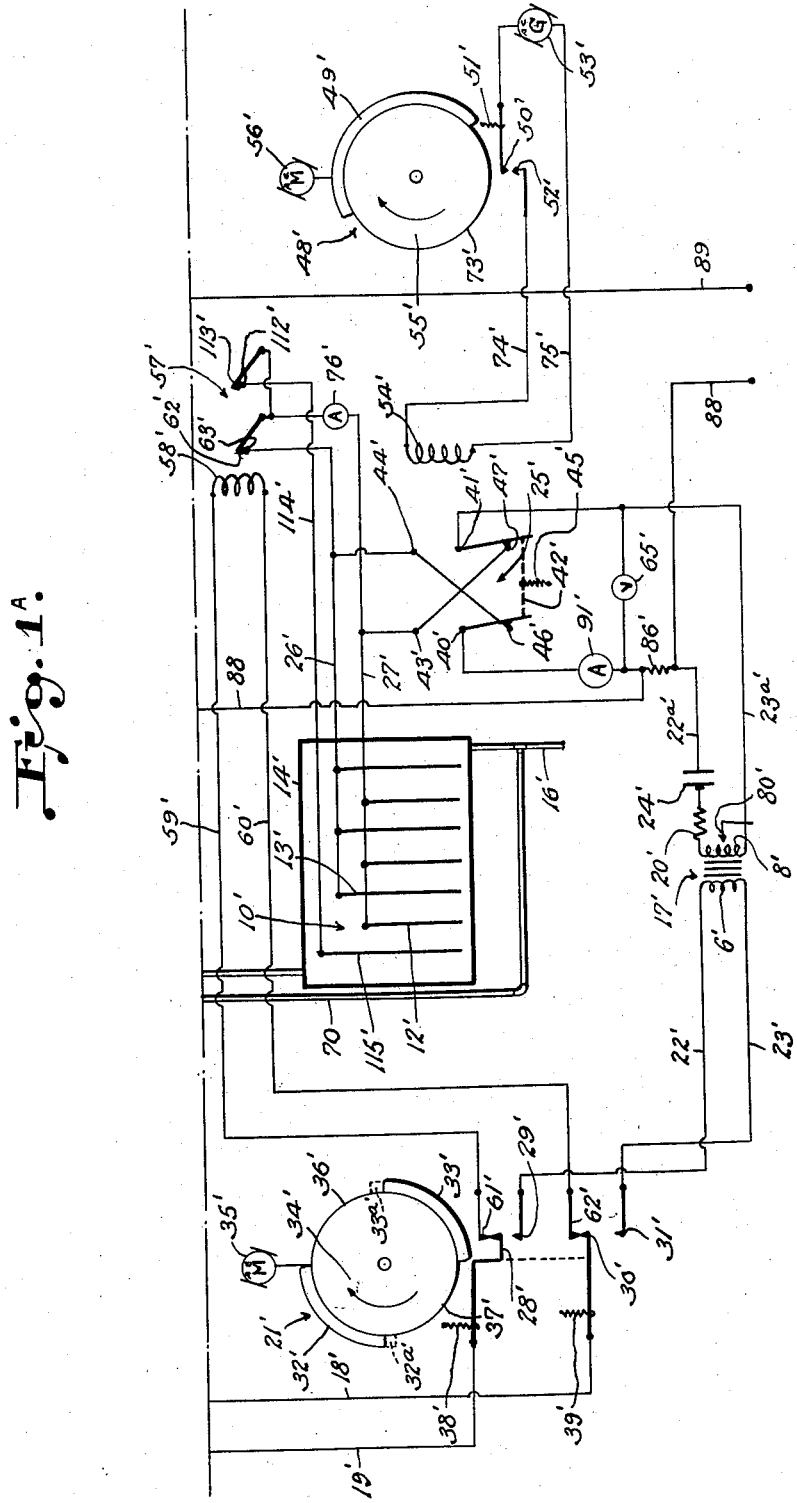

INVENTOR.
Paul S. Roller

United States Patent Office 2,860,090
Patented Nov. 11, 1958

2,860,090

ELECTROLYTIC GENERATION OF METAL HYDROXIDE

Paul S. Roller, Washington, D. C.

Application February 29, 1952, Serial No. 274,120

16 Claims. (Cl. 204—96)

The invention pertains to the electrolytic generation of metal hydroxide, and more particularly to an improvement in method and apparatus for the generation of aluminum hydroxide relative to the purification of water.

A classical deterrent to a commercially successful process involving the electrolytic generation of metal hydroxide for purification of liquids has been the continuously increasing voltage required to maintain a given current. It has been assumed that this effect is due to the formation of films or coatings on the electrodes. Reversal of the direction of the current has been believed to be useful in overcoming these postulated effects. Illustrative of the such general knowledge is Hartman, 951,315, who provides an apparatus for reversing the current periodically, and Bonine, 1,956,411 who provides an apparatus for reversing the current at each recurring abnormally high voltage.

The principle of current reversal is intrinsically useful in that it permits a metal hydroxide-producing electrode, for example of aluminum or iron immersed in a conducting liquid such as natural or municipal water, or a liquid such as sewage to which conducting salts such as lime or other alkali may be added, as is known in the art, to be used both as anode and cathode, so that a cell has twice as many active electrodes as it would have if the cathode were inert. Reversal of the current has proven to be detrimental since it gives rise to abnormally increasing voltages with increase in the duration of the electrolysis, the voltages being measured at approximately the median time of any cycle of reversals. The excessive voltages necessitate excess power and are correspondingly uneconomic. In addition, at the excess voltages required to maintain a given current, the electrolytic output of metal hydroxide is undesirably reduced, apparently due to gas formation at the anodes. Therefore, ordinary reversal of the electrolytic current as heretofore practiced has been impracticable.

It is well known in the electrolytic art that the two similar electrodes of an electrolytic cell after a period of electrolysis become electrically unequal due to change in surface metal composition and differences in ionic and gaseous cell concentrations. As a result, the cell after cessation of electrolysis possesses a polarization potential. Moreover, while the fact of polarization of the electrodes is known to the common electrolytic art, no relationship between polarization and electrolytic metal hydroxide production has been heretofore conceived of which would lead to a basic modification of the ordinary sequence of reversals in terms of considerations dictated by the said polarization.

I have now discovered that the detrimental effect of current reversal, leading to the requirement of rapidly increasing voltages as above stated, is in part associated with the polarization potential of the cell. In brief, if after a period of electrolysis, I cause a substantial discharge of the polarization of the cell prior to renewal of the electrolytic current, electrode efficiency is greatly improved, and reversal of current direction may be effected without causing an abnormal rate of increase of electrolytic voltages to excessive values as the electrolytic time increases. Moreover, by effecting a substantial discharge of the polarization of the metal hydroxide-producing electrodes before reversing the direction of the electrolytic current, I avoid fluctuations of the metal hydroxide output in view of obtaining at the very beginning of each cycle of reversals after polarization discharge a normal rate of output.

It is therefore an object of this invention to diminish current reversal deterioration of metal hydroxide-producing electrodes in electrolysis by providing a process for substantially exhausting the polarization current of the electrodes and discharging their polarization before each reversal of electrolytic current.

Another object is to avoid abnormally increasing voltages required to maintain a given electrolytic current by providing for discharge of the polarization of the electrodes of an electrolytic cell during a time-delay interval between the breaking and the re-making of the electrolytic current.

Still another object is to provide for a uniform output of electrolytic metal hydroxide at a given current while periodically reversing the direction of the current by means of placing a polarization discharge circuit around the electrodes for a substantial period of time between current reversals.

A further object is to provide apparatus for periodically reversing the polarity of the current passing to metal hydroxide-producing electrodes while interposing a period of discharge of the electrode polarization between successive cycles of reverse current passage.

Another object is to provide apparatus for maintaining continuity of electrolysis while intermittently opening an electrolytic circuit and providing a time-delay interval in reverse current application in order to substantially discharge the polarization of the cells.

Still another object is to provide an apparatus for regulating the electrolytic current to a constant predetermined value while intermittently closing a circuit to reduce the polarization of the electrolytic cells prior to reversal of the current thereto.

An additional object of this invention is to provide an improvement in the continuous operation of electrolytic cells for the production of metal hydroxide with substantially constant electrolytic currents while avoiding the requirement of excessively increasing voltages to abnormally high values during continued electrolytic generation.

Other objects and advantages will be apparent from the following description of the drawings, wherein:

Figs. 1 and 1A are match-line diagrammatic plan views of a set of electrolytic cells and current controls and cell depolarization controls in the instance of continuous production of metal hydroxide in accordance with my invention and, Fig. 2 is a diagrammatic plan view of an electrolytic current regulator associated with the current controls and cell depolarization controls of Figs. 1 and 1A.

Figure 2:
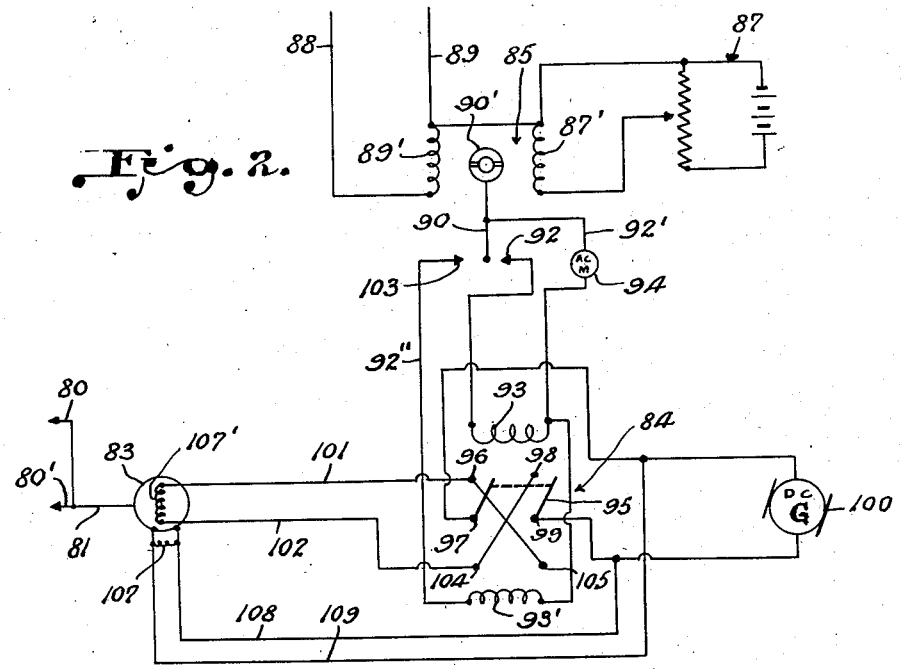

In Fig. 1 the electrolytic cell 10 consists of plurality of or set of similar plate electrodes 12 of one sign and of similar plate electrodes 13 of the opposite sign. Cell 10 is housed in case 14 which has a liquid or water inlet 15 and effluent outlet 16, the said outlet 16 being also an inlet in case 14' for cell 10'. The outlet 16', following outlet 70, as hereinafter described, is provided for feeding cell effluent to a point of usage, as a filter, distributor, or collection system. The structures and operation of the cells 10 and 10' are similar in character, and to avoid duplication of description, like parts are indicated by similar and prime numbers. It is to be understood that cells 10 and 10' are merely representative, and there may be a plurality or sets of the cells 10 and cells 10', each member of the plurality or set operating in a manner similar to that as herein described.

Generator 9 delivers current to electrodes 12 and 13 through conductors 18 and 19, timing switch 21, conductors 22 and 23 on the primary 6 of transformer 17, conductors 22a and 23a on the secondary 8 of transformer 17, ballasting resistance 20, rectifier 24, reversing relay 25 and conductors 26 and 27. A circuit is made by timing switch 21 through the closing of contacts 28 and 29, and contacts 30 and 31, by virtue of segments 32 and 33 periodically pressing contactors 28 and 30 against 29 and 31 respectively. Segments 32 and 33 may be integral with or supported on dial 34 of timing switch 21, the dial 34 being rotated by synchronous motor 35. The cell feed circuit, controlled by timing switch 21, is broken when non-segment portions 36 and 37 of dial 34 are over contactors 28 and 30, whereby cell 10 is placed on a closed circuit for exhausting the polarization current, as hereinafter described.

The making of the circuit by timing switch 21 causes electrolytic current to be delivered to cell 10 through reversing relay 25. When relay 25 is energized, the circuit to cell 10 is through contacts 40 and 41, which the armature 42 closes through fixed contacts 43 and 44 against the action of spring 45. When the relay 25 is not energized, the circuit is through armature contacts 40 and 41 closed through fixed contacts 46 and 47 by reason of the action of spring 45. Contacts 43 and 47, and contacts 44 and 46, are cross-connected. Hence, the electrolytic current when delivered to cell 10, is in one direction when relay 25 is energized, and is in the reverse direction when relay 25 is not energized.

The operation of relay 25, and hence the control of the cycle of electrolytic current reversals, is effected through timing switch 48 moving the protruding segment 49, which presses against the contactor 50, offsetting the pull of spring 51 and setting contactor 50 against fixed contact 52, thus completing a circuit from generator 53 through conductors 74 and 75 and coil 54 energizing relay 25. When segment 49 no longer presses against contactor 50, during rotation of the non-segmented section 73 of dial 55, spring 51 breaks contacts 50 and 52 and opens the circuit to coil 54, and thereby deenergizing relay 25. The segment 49 may be an integral part of, or fixed on, dial 55, and is rotated by synchronous motor 56 which is in exact timed relation to synchronous motor 35. Therefore, segment 49, in phase relation to segments 32 and 33, is positioned so that it makes contact in advance of the contacts made by segment 32, and breaks contact in advance of the contacts made by segment 33. In other words, the making and breaking of contacts 50 and 52 by segment 49, and hence the reversals of current direction to cell 10 by relay 25, takes place only when an open electrolytic circuit has been established by timer 21 throughout a time interval of open electrolytic circuit as determined by the making and breaking of its electrical contacts. Thereby, through operation of relay 25, the current to the electrodes of battery 10 is held in one direction when segment 32 makes a contact, and is held in reverse direction when segment 33 makes contact, in each instance after predetermined time-lag off-current intervals to effect a discharge of the electrode polarization current.

In order to produce a discharge of the polarization of electrodes 12 and 13, the cell 10, during the off-current intervals, is periodically placed in a separately closed circuit through operation of relay 57 prior to current reversal, while during the same interval the current is switched in direction as hereinabove explained. The manner of effecting the closed polarization discharge circuit is as follows. The relay 57 is actuated by current passing through coil 58 from conductors 59 and 60 supplied with current from conductors 18 and 19, and across contacts 28 and 61, and 30 and 62, which contacts are closed, for example, by springs 38 and 39 respectively, when non-segmented sections 36 or 37 of dial 34 are passing through their respective stages of breaking contacts 28 and 29, and 30 and 31 respectively. The energizing of coil 58 causes contact 62 to close against contact 63 whereby a closed circuit is made to electrodes 12 and 13 through conductors 26 and 27. Thus, whenever battery 10 is not receiving current from conductors 18 and 19, it is immediately placed in a separate closed circuit which discharges the polarization of the electrodes 12 and 13 of battery 10. The time of retention in the discharging closed circuit is determined by the length or rotational time periods of non-segments 36 and 37. The degree of discharge may be determined by the polarization current exhaustion by reading ammeter 76 placed in the discharging circuit, and it may be evaluated as the ratio of the polarization current during discharge to the initial polarization current at the instant of opening the electrolytic circuit.

During the period of time cell 10 is operating intermittently as a single unit and its polarization is being discharged, it is preferred that liquid feed through conduit 15 be automatically stopped by solenoid control valve 65. The solenoid control valve 65 is operated to on and off positions by the flow of current through conductors 66 and 67 which are fed by conductors 22 and 23, in conjunction with the operation of cell 10, all of which are controlled by the timer 21, as described.

When solenoid valve 65 is open during the electrolytic period, valve 68 being closed, liquid flows through conduit 15, cell 10 in case 14, conduit 16, conduit 70, valve 71 being closed and valve 72 open, to a point of useage, such as a filter, sedimentation tank or other suitable container as is known in the art.

Cell 10 and its controls, as herein described, may serve as a single unit for intermittently producing metal hydroxide.

The second cell 10' is utilized in alternate relation to cell 10 whereby despite intervals of polarization discharge, continuous generation of metal hydroxide is obtained, as hereinafter described. The hand valve 68 in by-pass 69 is opened to provide for continuous liquid feed to cell 10 through the conduit 15, switch 66a on conductor 66 being opened to cut off the current to solenoid valve 65 and render it inoperative. Liquid from cell 10 in case 14 flows through conduit 16; valve 72 being closed and valve 71 open, the liquid passes into cell 10' in case 12', and then out through conduit 16' to point of useage.

The controls of cell 10' are similar to cell 10 but in synchronized alternate relation thereto, as shown by the match-line view of Fig. 1A, which with the exception of being in alternate relationship to Fig. 1, is otherwise the same in layout and parts as identified by similar numerals with prime markings. That is, the cell 10', timers 21' and 48', relays 25' and 57', and associated circuits are the same in detail as described in Fig. 1.

By the term alternate relationship is meant that the segments 32', 33', and 49' on dials 34' and 55' are synchronized, relative to their counterparts 32, 33 and 49 on dials 34 and 55, to operate the electrical contacts between 28', 29' and 61', and 30', 31' and 62', and 50' and 52', respectively, to control cell 10' for electrolytic on-current and off-current periods and polarization discharge intervals of cell 10', in the same manner but in alternate time periods, as hereinbefore described for cell 10.

By having timers 21 and 21' operate alternately, the electrolytic on and off periods, and polarization discharge intervals being in alternate synchronized relationship, either cell 10 or cell 10' is at all times electrolytically operative. The instant of time during the change-over involves no sensible loss in electrolytic generation of metal hydroxide in the liquid passing into the cells 10 and 10' from inlet conduit 15 to outlet conduit 16 and 16'. In other words, continuity of electrolytic generation of metal hydroxide in the liquid is effected by the alternate synchronized operation of cell 10' and cell 10, as described.

The length of time that a cell is receiving current, or when it is otherwise on the polarization discharge interval of the cycle, is predetermined by the ratio of length of segment sections 32 or 33 to non-segmented sections 36 or 37 on dial 34. In view of the mutual supplementation of cell 10 and cell 10', segment 33 or 33' and non-segment 36 or 36' is desirably in each case of equal magnitude. In other words, each cell will be electrolytically on and off for substantially equal lengths of time in which, during the on-period, current is being delivered to a cell, and during the off-period an equal time interval is provided during which the polarization is being discharged from the cell. Thus, for example, each cell 10 or 10' may be set to have cycles through operation of the timer mechanisms as described, such as the following: on-current electrolytically for two hours, polarization discharge for two hours, on-current electrolytically but with reversed direction of current for two hours, polarization discharge for two hours, and so on repetitively with each cell 10 and 10' operated in synchronized alternate relation one to the other whereby continuous current and continuous generation of metal hydroxide is obtained.

The segments 32 and 33, 32' and 33' of timers 21 and 21' respectively may be extended beyond a quadrant in length so that each segment of the timer 21 successively and alternately overlaps the adjacent segment of the other timer 21', and vice versa. Such overlappings are illustrated by the dotted line areas 32a and 33a, and 32a' and 33a', respectively. When a cell comes out of the polarization discharge part of the cycle onto electrolytic stream, the cell resistance is at first high. By overlapping the cells, as described, so that both are for a short time electrolytically operative together, the output of metal hydroxide is maintained because of the summation of two decreased currents until the newly cut-in cell will have overcome its initial high resistance and attained to its natural low voltage requirement for the same rate of production of metal hydroxide throughout the electrolytic on-current period.

Regulation of the electrolytic current to cell 10 may be effected proximately through the employment of ballasting resistance 20, and more precisely through the current control system, as hereinafter described. As regards the utilization of ballasting resistance 20 for current control, in supplying electrolytic current of a given value to cell 10, contactor 80 on secondary 8 of transformer 17 may be manually moved to a position such that the electrolytic battery voltage as read on voltmeter 65 is at a practical mean value required to supply the given current. When ballasting resistance 20 is sufficiently greater than that of the mean resistance of cell 10, say about three times as great or more, then the current supplied to cell 10 is for all practical purposes acceptably constant. If the ratio of resistances is exactly three times, then the percentage fluctuation in electrolytic current is only one-fourth the percentage fluctuation in resistance of the cell. If the latter at its maximum is 40%, then the maximum variation in current is 10%. For many practical purposes, ballasting resistance 20 may thus provide a sufficiently good current control. This control can further be improved by increasing the ratio of resistances of ballasting resistance 20 to that of cell 10, for example above the cited value of three. As heretofore indicated, the operation and control of the structure marked with prime numbers is the same as described with respect to the basic numerals. For example, the contactor 80' on secondary 8' may be manually moved to supply electrolytic current to cell 10', in the manner and for the purposes as herein described.

A more accurate current control, and one which consumes no power due to the electrolytic current, as does ballasting resistance 20, is shown in Fig. 2. Contactor 80 on shaft 81 of motor 83 is moved along the windings of secondary 8 in response to the voltage demand of cell 10 for a given required current. When utilizing the system as shown in Fig. 2, the ballasting resistances 20 and 20' are omitted.

The motor 83 is a reversing motor controlled by a double coil reversing relay 84 and a galvanometer relay 85 for controlling reversing relay 84. Pilot resistance 86 is included in conductor 22a and the voltage drop across the resistance 86, established across coil 89' through conductors 88 and 89, is balanced against the voltage from potentiometer 87, established across coil 87'. The balancing of the magnetic field of coil 89' against that of coil 87' determines the positioning of armature 90 of galvanometer relay 85. When armature 90 is in the central off-position, the voltage of pilot resistance 86 balances that of potentiometer 87, and the electrolytic current is at the regulated value, as indicated by ammeter 91. If the current passing to the cell circuit should be temporarily too high, armature coil 89' acts on the magnet 90' of armature 90 which closes the circuit 92' through contact 92 and causes coil 93 of double coil relay 84 to be energized by generator 94. Armature 95 is then thrown so as to cause closure of the contacts 96 and 97, and 98 and 99, on relay 84. The circuit from D. C. generator 100 passes to the armature winding 107' of motor 83 through conductors 101 and 102, and since a direct current feed from generator 100 passes to field coil 107 through conductors 108 and 109, motor 83 is caused to rotate so as to cut out turns on the secondary of transformer 17 by the motion of contactor 80 imparted to it by motor 83. The voltage to cell 10, by way of conductors 22a and 23a, is thereby reduced, restoring the electrolytic current to its normal value. Conversely, if the electrolytic current is temporarily too low, armature 90 closes the circuit 92" through contact 103 causing coil 93' to be energized. Armature 95 is now thrown in the opposite direction, causing the closing of contacts 97 and 104, and 99 and 105, and effecting the reverse rotation of motor 83 by excitation of its armature 107' by reversed current from generator 100. The reverse rotation of motor 83 causes turns to be cut in on transformer 81 through the reverse movement of contactor 80, with a resultant increase in voltage to cell 10, thereby raising the electrolytic current to its normal regulated value.

The current regulating system as described for cell 10, applies equally to battery 10'. In the case of cell 10, pilot resistance 86 operates to control motor 83, and in the case of cell 10', pilot resistance 86' operates to control the motor 83. Contactors 80 and 80' are simultaneously operated by the shaft means 81 on motor 83. When cells 10 and 10' are alternatively operative, the current regulating system as described controls first one of the cells and then the other, alternately as each goes into electrolytic stream.

When the segments on timing switch 21 and 21' overlap, as heretofore described, the current control system operates as follows. When segments 32 and 33' or 33 and 32', overlap, cell 10 will have been on electrolytic stream with pilot resistance 86 in control of the electrolytic current. As cell 10' cuts into the electrolytic stream, pilot resistance 86' of cell 10', which at first contributed nothing to the current regulation, now takes a voltage drop and is temporarily simultaneously operative with pilot resistance 86 of cell 10. The pilot resistances 86 and 86' being in series, the combined voltage drop serves to regulate the electrolytic current developed by generator 9 instead of a voltage drop from either pilot resistance alone. The regulated current value is shared by both cells 10 and 10' until such time that cell 10 is cut out of the electrolytic stream by the ending of the overlap period, at which time the entire regulated current is carried by battery 10' alone. Reciprocally, when segments 32 and 32', or 33 and 33' overlap, cell 10 cuts into the electrolytic stream and pilot resistance 86 is temporarily operative simultaneously with pilot resistance 86' until such time as cell 10 is cut off by the ending of the overlap period.

Figure 3:
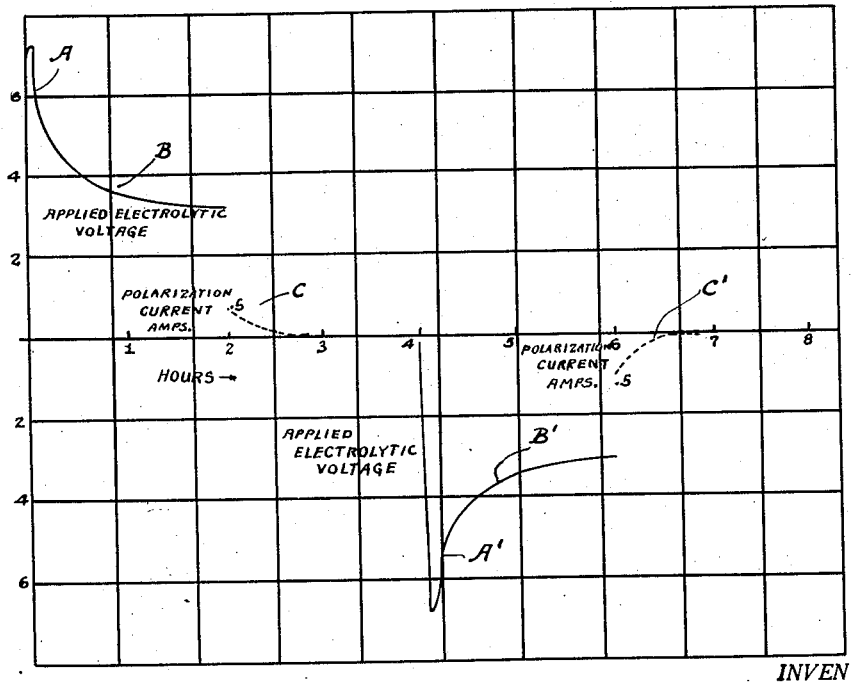
Fig. 3 is a graph illustrating a complete cycle of electrolytic voltages occurring during reverse current electrolysis and exhausting of depolarization currents during the interval of cell short-circuiting before current reversal, the electrolytic current being maintained substantially constant.

Fig. 3 illustrates measured values of the polarization discharge current during cycles of electrode polarization discharge following each cycle of reverse electrolytic current passage to the electrodes, and the voltages during cycles of electrolytic current passage, the current being regulated to a substantially constant value in the manner as described. This example is for the case of a cell of aluminum anodes and cathodes immersed in a municipal tap water, the conductivity of which results from the natural salts present. However, I do not regard myself as limited by this example, as it will be readily understood that other metal hydroxide-producing electrodes and other liquids suitable therewith will come under the same general principle as exemplified hereinabove. The curves as shown include an on-period of passing electrolytic current to a cell followed by an off-current interval of polarization discharge during which interval the current direction is switched, and then an on-period of passing a reverse electrolytic current to the cell, and then again an off-current or time-lag period of polarization discharge, to complete the cycle. The curve portion A shows the high or peak voltage obtained at the initial stage of an on-current period, and the curve portion B shows the subsequent decrease in voltage extending throughout the later stage of the on-current period. The initial voltage peak is small in the case of new electrodes but becomes augmented during the course of continued electrolytic generation. When the electrolytic circuit is opened, the succeeding off-current or time-lag period, represented by curve C, is obtained. Curve C shows the polarization current and its exhausting, through a secondary circuit closed upon the electrodes between the current reversals during a predetermined time-lag interval to very low values, which may be zero or on the order of zero; curve portion A' shows the initial voltage peak during the succeeding stage of reverse current electrolysis; and curve portion B' shows the decrease in curve voltage throughout the later stage of the reverse current on-period. The curve C' is obtained in the following time-lag interval, and shows the exhausting of the polarization current of the cell on an imposed polarization discharge circuit following the reverse stage of electrolysis and before beginning another reversal of electrolytic current.

The termination of the electrolytic voltage may take place prior to reversal at any convenient point along the electrolytic curves A B and A' B', generally on the flat part of the curves where the voltage is low and practically steady. Thereafter, the electrolytic circuit is opened, the polarization discharge allowed to take place through a closed discharge circuit, and then the electrolytic circuit is again closed but in reverse current flow.

The depolarization curves C and C' are illustrative. The discharge is asymptotic to the time axis, and it may be cut off at any suitable time along these curves at which a degree of discharge has been effected sufficiently to produce the continued maintenance of electrode efficiency as hereinabove described.

Generally about two minutes may be required for the polarization current to exhaust to about half its initial value on a dead short closed circuit placed between electrodes 12 and 13, or 12' and 13', as herein described. About 20 minutes may be required for 90% of the initial polarization current to be exhausted in this manner. Longer times of the order of an hour and more may be necessary for complete exhaustion to zero polarization current.

A substantial polarization discharge may be effected otherwise than by placing electrodes 12 and 13 on a dead short closed circuit through conductors 26 and 27. A resistance may be placed in the closed circuit to retard the rate of exhausting of the polarization current. Moreover, in view of an extremely slow leakage of polarization current that inevitably occurs during off-current intervals in the absence of a definite closed discharge circuit placed on electrodes 12 and 13, polarization current exhaust by slow leakage may alternatively, though less desirably, be incorporated into the off-current and polarization discharge intervals.

The off-current interval is controlled so as to effect a polarization current exhaustion generally of from about 10% to 100%, and preferably from about 50% to 100%. The time of discharge the polarization current may vary is from about one-half minute to several hours, depending upon the degree of polarization current discharge required and the kind of polarization discharge circuit. Under my preferred conditions, involving the discharge on a dead-short closed circuit and a polarization current exhaustion of from about 50% to 100%, the time of discharge is from about 2 minutes to 2 hours. As hereinabove illustrated, in a periodic sequence of equal cycles of reverse current, the time of closed circuit depolarization is preferably equal to the time of each cycle, a condition which is obtained when contact segments 32 and 33 and non-contacting segments 36 and 37 are all of equal length while contacting segment 49 and non-contacting segment 73 have of twice the length as shown in Figure 1, and similarly for Figure 1A.

The application of a closed circuit on battery 10 during the off-current interval, as described, may also be advantageous if the electrolytic operation is conducted without reversal. It is aimed to effect a substantial exhausting of the polarization current during the off-current interval. In the unidirectional passage of current, timer 48 and relay 25 are omitted, and lines 22a and 23a may be joined directly to lines 26 and 27 connected to electrodes 13 and 12.

With my new method as hereindescribed, I prefer to employ in combination therewith my method of resilient wiping of the electrodes, as described in my co-pending application, Ser. No. 200,775, now abandoned. In this way, the long term formation of crusted coatings on the electrodes is avoided, and an efficient production of metal hydroxide results over an extended period of time throughout the life of the electrode.

Having thus described my invention, it will be recognized that adaptations of the process and structure may be made which will fall within the terms and scope of my claims.

What I claim is:

1. In the method of generating from metal electrodes insoluble metal hydroxide in an aqueous liquid non-solvent thereto, the steps comprising passing an electrolytic current through an electrolytic circuit in one direction across the electrodes of the metal, opening the electrolytic circuit, closing a polarization discharge circuit across the electrodes and discharging the polarization of the electrodes during the interval of open electrolytic circuit to at least about 90% of its initial value after opening the electrolytic circuit, and thereafter passing an electrolytic current in reverse direction across the electrodes.

2. The method of continuously generating suspensions of aqueous liquid insoluble metal hydroxide by alternately and periodically reversing electrolytic currents passing to a plurality of sets of electrodes comprising the steps of continuously passing liquid to the sets of electrodes, alternately and periodically passing an electrolytic current to said sets of electrodes, alternately and periodically cutting off the electrolytic current passing to one of the sets of electrodes while in out-of-phase current relationship with another set of electrodes, closing a polarization discharge circuit across each set of electrodes during alternate and periodic cut-off of the electrolytic current passing thereto in order to effect a substantial lowering of the polarization current relative to its initial value at the beginning of the electrolytic current cut-off, and continuously discharging liquid suspensions of metal hydroxide produced by the electrolytic currents.

3. In the method of electrolytically generating from metal electrodes insoluble metal hydroxide in an aqueous liquid non-solvent thereto the steps comprising passing current across the electrodes of the metal, cutting off the passage of current to the electrodes, closing a polarization discharge circuit across the electrodes during the electrolytic current cut-off for from 2 to 120 minutes, to reduce the polarization current of the electrodes during the electrolytic cut-off period to a substantially lower value than its initial value at the moment of cut-off, and resuming passage of the electrolytic current in reverse direction across the electrodes.

4. In the method of generating insoluble metal hydroxide in an aqueous liquid non-solvent thereto from a plurality of electrodes of the metal, the steps comprising passing electrolytic current to the electrodes in view whereof they acquire a polarization potential, breaking the electrolytic current, during the interval that the electrolytic current is off discharging the polarization of the electrodes for a substantial length of time, switching the direction of the electrolytic current, and thereafter again passing the electrolytic current in reverse direction.

5. The method of claim 4 wherein the metal is aluminum.

6. The method of claim 4 wherein the metal is iron.

7. In the method of generating insoluble metal hydroxide in an aqueous liquid non-solvent thereto from a plurality of electrodes of the metal by employing periodic reverse current cycles, the steps subsequent to cyclically breaking the electrolytic current comprising placing a polarization discharge closed circuit upon the electrodes and switching the direction of the current to the electrodes, thence resuming passage of electrolytic current to the electrodes in reverse direction.

8. In the method of generating insoluble metal hydroxide in an aqueous liquid non-solvent thereto from a plurality of electrodes of the metal by employing periodic reverse current cycles, the steps subsequent to cyclically breaking the electrolytic current comprising placing a polarization discharge closed circuit upon the electrodes, switching the direction of the current to the electrodes, thence resuming passage of electrolytic current to the electrodes in reverse direction, and regulating the current to a constant value during each cycle of electrolysis.

9. In the method of generating insoluble metal hydroxide in an aqueous liquid non-solvent thereto from a plurality of electrodes of the metal by employing periodic reverse current cycles the steps subsequent to periodically breaking the electrolytic current of placing a polarization discharge closed circuit across the electrodes in cycles of equal duration to the electrolytic cycles and switching the direction of the current to the electrodes, thence resuming passage of electrolytic current to the electrodes in reverse direction.

10. In the method of generating insoluble metal hydroxide in an aqueous liquid non-solvent thereto from a plurality of electrodes of the metal which are divided into at least two independent sets of cells by employing periodically reversed electrolytic current, the steps in the instance of one of the sets subsequent to the periodic breaking of the electrolytic current comprising placing a closed depolarizating circuit across the electrodes of the sets and switching the direction of the current to the electrodes, thence passing reverse electrolytic current to the set, and similarly for every other set in mutual alternate relation, whereby metal hydroxide is continuously generated while applying electrode depolarization cycles to each set.

11. In the method of generating insoluble metal hydroxide in an aqueous liquid non-solvent thereto from a plurality of electrodes of the metal which are divided into at least two independent sets, the steps of alternately passing periodically reversed electrolytic current to the electrodes of each set, alternately and periodically after breaking the electrolytic current placing a closed depolarizing circuit across the electrodes of each set and switching the current direction, the cycles of current passage and of electrode depolarization being of equal time duration, whereby metal hydroxide is continuously generated while providing electrode depolarization cycles to each set.

12. In the method of generating insoluble metal hydroxide in an aqueous liquid non-solvent thereto from a plurality of electrodes of the metal which are divided into at least two independent sets, the steps of alternately passing periodically reversed electrolytic current regulated to constant value to the electrodes of each set, and alternately periodically after breaking the electrolytic current placing a closed depolarizing circuit across the electrodes of each set and switching the current direction, the cycles of current passage and of electrode depolarization being of equal time duration, whereby metal hydroxide is continuously generated while applying intermediate cycles of electrode depolarization to each set.

13. The method of generating aqueous-liquid insoluble metal hydroxide electrolytically by operation of a plurality of metal electrode cells in an aqueous liquid comprising the steps of passing reverse electrolytic current to some of the cells, providing an off-current interval between reversals of current, during the off-current interval placing a closed polarization discharge circuit across the cells in order to effect a substantial polarization current decrease relative to its initial value at the beginning of the off-current interval and also switching the direction of the current, and similarly for the other cells in alternate relation to the former whereby metal hydroxide is generated continuously.

14. An apparatus for producing suspensions of metal hydroxide comprising at least two sets of electrolytic cells of metal electrodes, liquid inlet and outlet conduit means, electrolytic current circuit means for each set of said cells, switch means in each said electrolytic current circuit for periodically cutting off the current supply, a polarization discharge circuit across each set of cells, switch means in each said polarization discharge circuit for closing the circuit during the interval of electrolytic current cut-off, reversing switch means in each said current circuit for changing the direction of the current to said electrodes during the current cut-off period, said switch means in each said set of electrolytic cells co-acting in alternate relation whereby metal hydroxide is continuously generated.

15. An apparatus for producing suspensions of metal hydroxide comprising at least two sets of electrolytic cells of metal electrodes, liquid inlet and outlet conduit means, electrolytic current circuit means for each set of said cells, switch means in each said electrolytic current circuit for periodically cutting off the current supply, a polarization discharge circuit across each set of cells, switch means in each said polarization discharge circuit for closing the circuit during the interval of electrolytic current cut-off, reversing switch means in each said current circuit for changing the direction of the current to said electrodes during the current cut-off period, current regulating means to provide constant current in said electrolytic circuit, said switch means in each set of electrolytic cells co-acting in alternate relation whereby metal hydroxide is continuously generated.

16. An apparatus for the electrolytic generation of suspensions of metal hydroxide comprising a plurality of electrodes, liquid inlet and outlet conduit means, an electrolytic current supply circuit to said electrodes, switch means in said circuit for providing off-current intervals between periods of current supply to said electrodes, reversing switch means in said current supply circuit for changing the direction of the current passing to said electrodes during the off-current intervals, an electrode polarization discharge circuit connected to said electrodes, and switch means for closing said polarization discharge circuit during the electrolytic off-current interval.

References Cited in the file of this patent

UNITED STATES PATENTS

| | | |
|---|---|---|
| 1,402,986 | Wikle | Jan. 10, 1922 |
| 1,428,050 | Nickum | Sept. 5, 1922 |
| 1,956,411 | Bonine | Apr. 24, 1934 |
| 2,237,103 | Lex | Apr. 1, 1941 |
| 2,293,657 | Mershon | Aug. 18, 1942 |
| 2,451,341 | Jernstedt | Oct. 12, 1948 |
| 2,508,523 | Krebs | May 23, 1950 |